United States Patent
He et al.

(10) Patent No.: US 10,997,443 B2
(45) Date of Patent: *May 4, 2021

(54) USER IDENTITY VERIFICATION METHOD, APPARATUS AND SYSTEM

(71) Applicant: ADVANCED NEW TECHNOLOGIES CO., LTD., Grand Cayman (KY)

(72) Inventors: Le He, Hangzhou (CN); Yukun Tuo, Hangzhou (CN); Liang Li, Hangzhou (CN); Mian Huang, Hangzhou (CN); Jidong Chen, Hangzhou (CN); Wenbo Yang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,376

(22) Filed: Sep. 30, 2019

(65) Prior Publication Data

US 2020/0026940 A1    Jan. 23, 2020

Related U.S. Application Data

(63) Continuation of application No. 16/282,102, filed on Feb. 21, 2019, now Pat. No. 10,467,490, and a (Continued)

(30) Foreign Application Priority Data

Aug. 24, 2016   (CN) .......................... 201610717080.1

(51) Int. Cl.
  *G06K 9/00* (2006.01)
  *H04L 29/06* (2006.01)
  *G06T 7/00* (2017.01)

(52) U.S. Cl.
  CPC ..... *G06K 9/00892* (2013.01); *G06K 9/00288* (2013.01); *G06K 9/00617* (2013.01);
  (Continued)

(58) Field of Classification Search
  CPC .......... G06K 9/00892; G06K 9/00288; G06K 9/00617; G06K 9/00906; G06K 9/00926;
  (Continued)

(56) References Cited

U.S. PATENT DOCUMENTS 6,247,813 B1   6/2001  Kim et al.
7,444,007 B2   10/2008 Schonberg et al.
(Continued)

FOREIGN PATENT DOCUMENTS

AU    2015297036 B2   9/2017
CA    2744757 C       6/2017
(Continued)

OTHER PUBLICATIONS

Examination Report No. 1 for Australian Patent Application No. 2017314341 dated Oct. 25, 2019 (3 pages).
(Continued)

*Primary Examiner* — Kim Y Vu
*Assistant Examiner* — Molly Delaney (57) ABSTRACT

This specification discloses a user identity verification method, apparatus, and system, relating to the field of information technology. The method comprises: receiving a facial image and one or more eye-print pair images corresponding to an identity verification object from a client, wherein a number of the one or more eye-print pair images corresponds to a number of eye-print collection steps, comparing the facial image to a preset facial image and comparing the one or more eye-print pair images to preset eye-print templates, and sending successful identity verification information to a client when comparison results for (Continued)

Receiving a facial image and one or more eye-print pair images corresponding to an identity verification object from a client, wherein a number of the one or more eye-print pair images corresponds to a number of eye-print collection steps — 101

Comparing the facial image to a preset facial image, and comparing the eye-print pair images to preset eye-print templates — 102

Sending successful identity verification information to the client if the comparison results for the facial image and the eye-print pair images meet preset conditions — 103 the facial image and the one or more eye-print pair images meet preset conditions.

20 Claims, 6 Drawing Sheets

Related U.S. Application Data continuation of application No. PCT/CN2017/096987, filed on Aug. 11, 2017.

(52) U.S. Cl.
CPC ..... *G06K 9/00906* (2013.01); *G06K 9/00926* (2013.01); *G06T 7/0002* (2013.01); *H04L 29/06* (2013.01); *G06T 2207/30168* (2013.01); *G06T 2207/30201* (2013.01)

(58) Field of Classification Search
CPC ......... G06T 7/0002; G06T 2207/30168; G06T 2207/30201; H04L 29/06; H04L 63/0861; G06F 21/32
See application file for complete search history.

(56) References Cited

U.S. PATENT DOCUMENTS

| | | | |
|---|---|---|---|
| 7,697,735 B2* | 4/2010 | Adam ................ | G06K 9/00885 382/118 |
| 8,317,325 B2 | 11/2012 | Raguin et al. | |
| 8,856,541 B1 | 10/2014 | Chaudhury et al. | |
| 9,082,011 B2 | 7/2015 | Komogortsev | |
| 9,811,730 B2 | 11/2017 | Komogortsev | |
| 9,898,596 B2 | 2/2018 | Lindemann | |
| 10,156,900 B2 | 12/2018 | Publicover et al. | |
| 2001/0026632 A1 | 10/2001 | Tamai | |
| 2002/0039433 A1 | 4/2002 | Shin | |
| 2004/0062423 A1 | 4/2004 | Doi | |
| 2005/0008201 A1 | 1/2005 | Lee et al. | |
| 2006/0029262 A1 | 2/2006 | Fujimatsu et al. | |
| 2006/0104485 A1* | 5/2006 | Miller, Jr. .......... | G06K 9/00885 382/115 |
| 2006/0210119 A1* | 9/2006 | Willis ................ | G06K 9/6277 382/115 |
| 2008/0052527 A1* | 2/2008 | Siedlarz ............. | G06F 21/6254 713/186 |
| 2008/0137918 A1 | 6/2008 | Eura et al. | |
| 2009/0169064 A1 | 7/2009 | Kim et al. | |
| 2010/0299530 A1* | 11/2010 | Bell .................. | G06F 21/32 713/186 |
| 2010/0310133 A1 | 12/2010 | Mason et al. | |
| 2012/0070041 A1 | 3/2012 | Wang | |
| 2012/0213420 A1 | 8/2012 | Steiner | |
| 2012/0293642 A1* | 11/2012 | Berini ............... | G06F 21/602 348/77 |
| 2013/0138652 A1* | 5/2013 | Bigdeli .............. | G06F 16/285 707/737 |
| 2013/0336547 A1* | 12/2013 | Komogortsev ....... | A61B 5/117 382/117 |
| 2014/0032923 A1 | 1/2014 | Marthinussen | |
| 2014/0044320 A1 | 2/2014 | Derakhshani et al. | |
| 2014/0118520 A1* | 5/2014 | Slaby ................ | G06K 9/00926 348/77 |
| 2014/0289833 A1 | 9/2014 | Briceno et al. | |
| 2014/0289834 A1 | 9/2014 | Lindemann | |
| 2014/0314283 A1* | 10/2014 | Harding ............. | G06K 9/00892 382/115 |
| 2014/0341441 A1 | 11/2014 | Slaby et al. | |
| 2014/0354405 A1 | 12/2014 | Kocher et al. | |
| 2014/0358954 A1 | 12/2014 | Kocher et al. | |
| 2015/0046711 A1 | 2/2015 | Slaby et al. | |
| 2015/0178547 A1* | 6/2015 | Bahjat ............... | G06K 9/0061 382/117 |
| 2015/0254508 A1 | 9/2015 | Kimura et al. | |
| 2016/0019420 A1 | 1/2016 | Feng et al. | |
| 2016/0112414 A1 | 4/2016 | Tsou | |
| 2017/0111789 A1 | 4/2017 | Tang | |
| 2019/0188509 A1 | 6/2019 | He et al. | |

FOREIGN PATENT DOCUMENTS

| | | |
|---|---|---|
| CN | 100347718 C | 11/2007 |
| CN | 100552696 C | 10/2009 |
| CN | 101178768 B | 11/2011 |
| CN | 103390153 B | 3/2013 |
| CN | 105678137 A | 6/2016 |
| CN | 105825102 A | 8/2016 |
| CN | 105848306 A | 8/2016 |
| CN | 106899567 A | 6/2017 |
| CN | 104778396 B | 1/2019 |
| EP | 1703463 A1 | 9/2006 |
| JP | 2000-357232 A | 12/2000 |
| JP | 2001-273498 A | 10/2001 |
| JP | 2004-118627 A | 4/2004 |
| JP | 2004164483 A | 6/2004 |
| JP | 2004-348308 A | 12/2004 |
| JP | 2005-141678 A | 6/2005 |
| JP | 2005-202732 A | 7/2005 |
| JP | 2006-107028 A | 4/2006 |
| JP | 2009-138490 A | 6/2009 |
| JP | 4863423 B2 | 1/2012 |
| JP | 5024012 B2 | 9/2012 |
| JP | 2014-515842 A | 7/2014 |
| JP | 2015-170099 A | 9/2015 |
| JP | 2016-082572 A | 5/2016 |
| JP | 6433978 B2 | 12/2018 |
| KR | 100453943 B1 | 6/2003 |
| TW | 201544988 A | 12/2015 |
| WO | 2015/191913 A2 | 12/2015 |

OTHER PUBLICATIONS

Office Action for Japanese Application No. 2019-510864 dated Mar. 24, 2020.
Yamada Asahiko, Ikeda Tatsuo, Introduction to information security for engineers, Monthly automatic recognition, Japan Industrial Publishing Co., Ltd., Jul. 10, 2012, vol. 25, No. 8, pp. 62-68. [English Abstract provded].
Orman, Z. et al., A Study on Face, Eye Detection and Gaze Estimation, International Journal of Computer Science & Engineering Survey (IJCSES) [online], Aug. 2011, vol. 2, No. 3, pp. 29-46, [Retrieved from Internet on Mar. 18, 2020], URL, https://researchgate.net/publication/264878015.
Office Action for Canadian Application No. 3034612 dated Jan. 31, 2020.
Notice of Allowance for Korean Application No. 10-2019-7007983 dated Feb. 12, 2020.
Search Report for European Application No. 17842812.4 dated Feb. 27, 2020.
Examination Report No. 2 for Australian Application No. 2017314341 dated Jan. 17, 2020.
Orman et al., "A Study on Face, Eye Detection and Gaze Estimation," International Journal of Computer Science & Engineering Survey, vol. 2, No. 3, Aug. 30, 2011.
Taiwanese Office Action and Search report for Taiwanese Application No. 106119851 dated Feb. 20, 2019.
International Search Report and Written Opinion dated Nov. 15, 2017, issued in related International Application No. PCT/CN2017/09698, 9 pages.
International Preliminary Report on Patentability for Application No. PCT/CN2017/096987 dated Feb. 26, 2019, 12 pages.
Taiwanese Office Action for Taiwanese Application No. 106119851 dated Apr. 19, 2019, 7 pages.
First Office Action for Chinese Application No. 201610717080.1 dated Aug. 29, 2019 with English machine translation (14 pages).
First Search for Chinese Application No. 201610717080.1 dated Aug. 20, 2019 (2 pages).

* cited by examiner

USER IDENTITY VERIFICATION METHOD, APPARATUS AND SYSTEM

CROSS-REFERENCE TO RELATED APPLICATIONS

The present application is a continuation application of U.S. patent application Ser. No. 16/282,102 filed on Feb. 21, 2019, which is a continuation application of International Application No. PCT/CN2017/096987, filed on Aug. 11, 2017, which claims the benefit of the Chinese Patent Application No. 201610717080.1 filed with the State Intellectual Property Office (SIPO) of the People's Republic China on Aug. 24, 2016. The entire contents of the above-identified applications are incorporated by reference herein.

TECHNICAL FIELD

This invention relates generally to the field of information technology, and more particularly some embodiments relate to a user identity verification method, apparatus, and system.

BACKGROUND

With the continuous development of information technologies and the Internet, a variety of applications have emerged. Of these, more and more financial institutions are providing users with apps to manage associated financial transactions. To ensure the security of user information, it is necessary to perform identity verification of the users managing financial transactions through apps, that is, performing user security verification operations such as identity authentication and name authentication.

Today, user identity verification is normally performed by employing a method of combining facial image recognition with live facial image verification, i.e. issuing facial movement parameters to the user when verifying a collected facial image, and requiring the user to complete live movement verification according to these movements. However, now it is possible to synthesize lifelike 3D facial images and simulate user facial movements and expressions, resulting in low precision and reliability for existing user identity verification methods, and making it unlikely to ensure the security of the apps used by users.

SUMMARY

In view of this, the disclosed embodiments of this specification provide a user identity verification method, apparatus, and system that solve the problems of low precision and reliability in the user identity verification methods of current technologies.

In one aspect, an embodiment of this specification provides a user identity verification method, comprising:
receiving a facial image and one or more eye-print pair images corresponding to an identity verification object from a client, wherein the number of the one or more eye-print pair images corresponds to a number of eye-print collection steps;
comparing the facial image to a preset facial image, and comparing the one or more eye-print pair images to preset eye-print templates corresponding to the identity verification object;
when comparison results for the facial image and the one or more eye-print pair images meet preset conditions, sending successful identity verification information to the client.

In another aspect, an embodiment of this specification provides another user identity verification method, comprising:
collecting a facial image and one or more eye-print pair images corresponding to an identity verification object, the number of the one or more eye-print pair images corresponding to a number of eye-print collection steps;
sending the facial image and the one or more eye-print pair images to the server, causing the server to perform identity verification of the identity verification object.

In another aspect, an embodiment of this specification provides a server, comprising:
a receiving unit, configured to receive a facial image and one or more eye-print pair images corresponding to an identity verification object from a client, wherein a number of the one or more eye-print pair images corresponds to a number of eye-print collection steps;
a comparison unit, configured to compare the facial image to a preset facial image, and compare the one or more eye-print pair images to preset eye-print templates:
a sending unit, when comparison results for the facial image and the one or more eye-print pair images meet preset conditions, configured to send successful identity verification information to the client.

In another aspect, an embodiment of this specification provides a client, comprising:
a collection unit, configured to collect a facial image and one or more eye-print pair images corresponding to an identity verification object, the number of the one or more eye-print pair images corresponding to a number of eye-print collection steps; a sending unit, configured to send the facial image and the one or more eye-print pair images to the server, causing the server to perform identity verification of the identity verification object.

In another aspect, an embodiment of this specification provides a user identity verification system, comprising:
a server, when receiving a user identity verification request, configured to send, to a client, a facial quality score threshold and the number of eye-print collection steps corresponding to the current mode;
a client, configured to obtain a facial image based on the facial quality score threshold and obtain one or more eye-print pair images, wherein the number of the one or more eye-print pair images corresponds to the number of eye-print collections steps;
the server is also configured to receive a facial image sent by a client and one or more eye-print pair images, wherein the number of the one or more eye-print pair images corresponds to the number of eye-print collection steps; compare the facial image to a preset facial image, and compare the one or more eye-print pair images to preset eye-print templates; and send successful identity verification information to the client when the comparison results for the facial image and the one or more eye-print pair images meet preset conditions.

In another aspect, an embodiment of this specification provides a non-transitory computer-readable storage medium for user identity verification. The non-transitory computer-readable storage medium stores instructions executable by one or more processors causing the one or more processors to perform operations comprising:
receiving a facial image and one or more eye-print pair images corresponding to an identity verification object from a client, wherein a number of the one or more eye-print pair images corresponds to a number of eye-print collection steps;

comparing the facial image to a preset facial image, and comparing the one or more eye-print pair images to preset eye-print templates; and when comparison results for the facial image and the one or more eye-print pair images meet preset conditions, sending successful identity verification information to the client.

The technical solutions provided by the embodiments of this specification possess at least the following advantages:

The user identity verification method, apparatus, and system provided by the embodiments of this specification comprise first receiving a facial image and one or more eye-print pair images corresponding to an identity verification object from a client, wherein the number of the one or more eye-print pair images corresponds to the number of eye-print collection steps, when a user identity verification request is received; then comparing the facial image to a preset facial image, comparing the eye-print pair images to preset eye-print templates; and sending successful identity verification information to the client when the comparison results for the facial image and the eye-print pair images meet preset conditions. Compared to the method of combining facial image recognition with live facial image verification, commonly used today when performing user identity verification, the embodiments of this specification use multidimensional verification modes such as facial verification combined with eye-print image verification and live eye-print image verification to perform user identity verification, thereby boosting the precision and reliability of the user identity verification method, and ensuring the security of apps used by the user.

The preceding explanation is merely a summary of the technical solutions of his invention. To enable a clearer understanding of the technical measures of this invention, to enable implementation in accordance with the content of this description, and to make the preceding and other objectives, features, and advantages of this invention clearer and more easily understood, specific implementation manners of this invention are presented below.

BRIEF DESCRIPTION OF THE DRAWINGS

By reading the following detailed description of preferred implementation manners, a variety of other advantages and benefits will become clear to persons having ordinary skill in the art. The drawings are merely illustrative, and are not to be taken as limiting. Similar reference symbols used in all drawings represent the same components. In the drawings.

DETAILED DESCRIPTION

Referring to the drawings, a more detailed description of the exemplary embodiments of this specification is given below. Even though the drawings present exemplary embodiments of this specification, it should be understood that this specification may be achieved in other forms and should not be limited by the embodiments described here. Rather, these embodiments are provided to enable a more thorough understanding of this specification and to transmit the scope of this specification in its entirety to persons skilled in the art.

Figure 1:
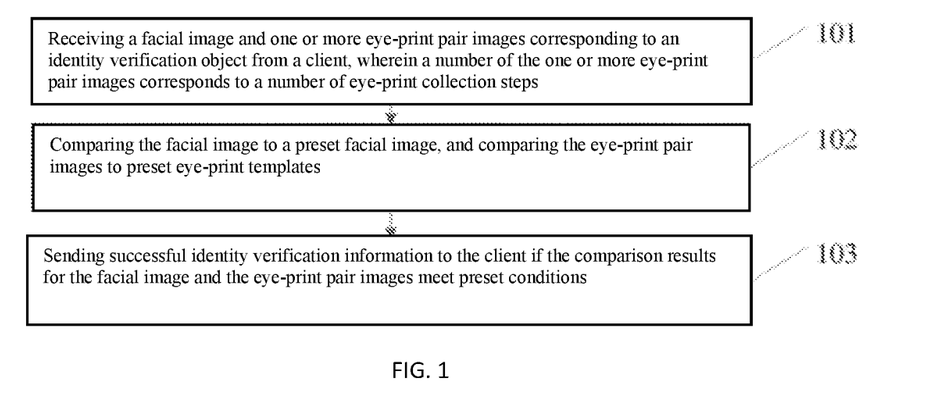
FIG. 1 presents a flow diagram of a user identity verification method provided by an embodiment of this specification.

An embodiment of this invention provides a user identity verification method, as shown in FIG. 1.

Referring to FIG. 1, the method includes receiving a facial image and one or more eye-print pair images corresponding to an identity verification object from a client, at 101. The number of the one or more eye-print pair images corresponds to a number of eye-print collection steps.

Because a larger number of eye-print collection steps results in a longer period of time in eye-print collection, when the number of the eye-print templates of the identity verification object is ample, a smaller number of eye-print collection steps may be used; when the number of the eye-print templates of the identity verification object is smaller, to collect eye-print pair images for the accumulation of eye-print templates for the identity verification object, a larger number of eye-print collection steps may be used. In some embodiments, it is possible to further boost the precision of user identity verification by configuring different numbers of eye-print collection steps based on different circumstances. The server can use communication means such as mobile cellular networks and WIFI networks to perform data transmission with the client. No limitations are placed on this by the embodiments of this specification.

Referring again to FIG. 1, the method includes comparing the facial image to a preset facial image, and comparing the eye-print pair images to preset eye-print templates corresponding to the identity verification object, at 102.

The preset facial image may be a photograph of the user that has been registered with a public security network, a facial photograph that has been verified by a user identity verification, or the like. No limitations are placed on this by the embodiments of this specification. The preset eye-print templates may be multiple sets of eye-print pair images that have been verified by a security verification process. The comparison operation may determine whether the degree of matching between images meets preset requirements. No limitations are placed on this by the embodiments of this specification.

Referring again to FIG. 1, the method includes sending successful identity verification information to the client when the comparison results for the facial image and the eye-print pair images meet preset conditions, at 103.

The preset conditions may include facial comparison score thresholds, eye-print match score thresholds, and the like. No limitations are placed on this by the embodiments of this specification. In some embodiments, when both the facial image and eye-print pair image comparison results meet preset conditions, a successful identity verification is determined. Thus the user identity verification is performed through multiple dimensions such as facial images and eye-print pair images, thereby boosting the precision of the user identity verification method.

An embodiment of this specification provides a user identity verification method. When a user identity verification request is received, first, a facial image and one or more eye-print pair images corresponding to an identity verification object are received from a client. The number of the one or more eye-print pair images corresponds to the number of eye-print collection steps. Then, the facial image is compared to a preset facial image, and the eye-print pair images are compared to preset eye-print templates. Successful identity verification information is sent to the client if the comparison results for the facial image and the eye-print pair images meet preset conditions. Compared to the method of combining facial image recognition with live facial image verification commonly used today when performing user identity verification, the embodiments of this specification use multidimensional verification modes such as facial image verification combined with eye-print image verification and live eye-print image verification to perform user identity verification, thereby boosting the precision and reliability of the user identity verification method, and ensuring the security of apps when used by the user.

Figure 2:
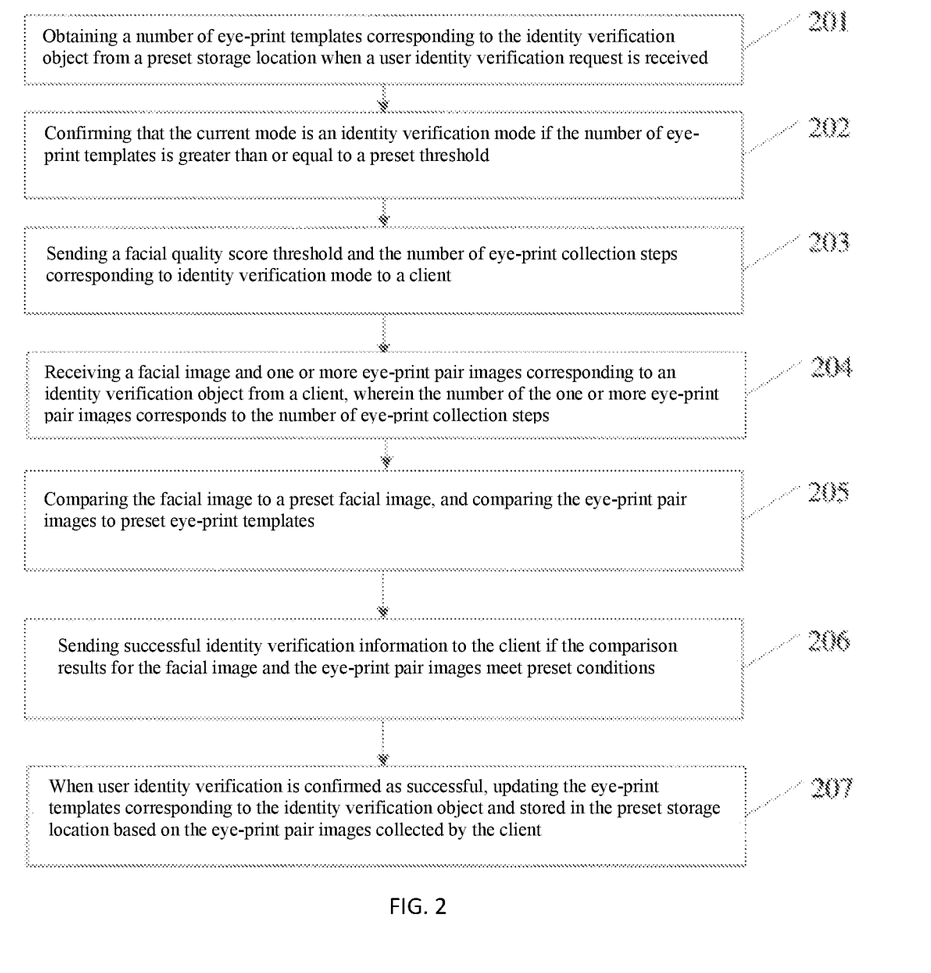
FIG. 2 presents a flow diagram of another user identity verification method provided by an embodiment of this specification.

Furthermore, an embodiment of this specification provides another user identity verification method, as shown in FIG. 2.

Referring to FIG. 2, the method includes obtaining a number of preset eye-print templates corresponding to the identity verification object from a preset storage location, when a user identity verification request is received, at 201.

The eye-print templates corresponding to different identity verification objects are stored in the preset storage location. When a user needs to perform security verification such as login identity validation or payment identity validation, a user identity verification request is sent to a client.

Following step 201, the embodiments of this specification may also comprise when the number of eye-print templates corresponding to the identity verification object is less than a preset threshold, determining the current mode as an eye-print enrollment mode; sending a facial quality score threshold and the number of eye-print collection steps corresponding to the eye-print enrollment mode to the client, to make the client obtain a facial image based on the facial quality score threshold and obtain one or more eye-print pair images corresponding to the number of eye-print collection steps; and storing the eye-print pair images in the preset storage location as the eye-print templates corresponding to the preset identity verification object.

It should be noted that when the number of eye-print templates is less than the preset threshold, it means that the number of eye-print templates at that time is rather low, and it may not be possible to ensure the precision of an eye-print verification. At that time, the current mode is determined as eye-print enrollment mode. This can enable the client to input in real time eligible eye-prints as the eye-print templates of the identity verification object, thus achieving the accumulation of eye-print templates. When the number of eye-print templates reaches the preset threshold, the identity verification mode is switched on, thus further boosting the precision and reliability of the user identity verification.

Referring again to FIG. 2, the method includes determining the current mode as identity verification mode if the number of eye-print templates is greater than or equal to a preset threshold, at 202.

Here, the current mode may comprise eye-print collection mode, identity verification mode, etc. The current mode is associated with the number of eye-print templates corresponding to the user that are stored in the preset storage location. No limitations are placed on this by the embodiments of this specification. It should be noted that for eye-print collection mode, the collected facial eye-print image quality requirements are quite high, to facilitate the server's accumulation of eye-print templates; for identity verification modes, average facial eye-print image quality is sufficient, because the server can perform eye-print comparisons using previously accumulated eye-print templates. For the facial quality score threshold used to indicate the quality of the facial image collected by the client, a higher facial quality score threshold requires a higher quality in the facial image collected by the client. The number of eye-print collection steps is used to indicate the number of eye-print pairs collected at one time by the client. For example, when the number of eye-print collection steps is 5, the client needs to collect 5 pairs of eye-prints.

It should be noted that, because a larger number of eye-print collection steps results in a longer period of time in eye-print collection, there will be different numbers of eye-print collection steps configured for different modes. For example, for identity verification mode, because there are an ample number of eye-print templates under this mode, a smaller number of eye-print collection steps may be configured; for eye-print enrollment mode, because this mode collects eye-print pair images for the accumulation of eye-print templates, a larger number of eye-print collection steps may be configured. In some embodiments, it is possible to further boost the precision of user identity verification by configuring different numbers of eye-print collection steps based on different modes.

Referring again to FIG. 2, the method includes sending a facial quality score threshold and the number of eye-print collection steps corresponding to the identity verification mode to a client, at 203.

As such, the client can obtain a facial image based on the facial quality score threshold and obtain one or more eye-print pair images corresponding to the number of eye-print collection steps. Here, the client may be configured on a mobile device with a webcam and microphone. These mobile devices include but are not limited to smartphones and tablet PCs. The client can use the webcam to collect relevant images.

Referring again to FIG. 2, the method includes receiving a facial image and one or more eye-print pair images corresponding to an identity verification object from a client. In some embodiments, the number of the one or more eye-print pair images corresponds to the number of eye-print collection steps, at 204.

The server can use communication means such as mobile cellular networks and WIFI networks to perform data transmission. No limitations are placed on this by the embodiments of this specification.

Referring again to FIG. 2, the method includes comparing the facial image to a preset facial image, and comparing the eye-print pair images to preset eye-print templates, at 205.

The preset facial image may be a photograph of the user that has been registered with a public security network or a facial photograph that has been verified by a user identity verification. No limitations are placed on this by the embodiments of this specification. The preset eye-print templates may be multiple sets of eye-print pair images that have been verified by a security verification process.

In some embodiments, if the current mode is determined as the identity verification mode, comparing the facial image to a preset facial image may comprise using the facial image and the preset facial image as input to a preset facial algorithm, and obtaining a facial comparison score corresponding to the identity verification object from the preset facial algorithm. Comparing the eye-print pair images to preset eye-print templates comprises using the eye-print pair images and the eye-print templates corresponding to the identity verification object as input to a preset eye-print algorithm, and obtaining multiple eye-print liveness scores corresponding to the number of eye-print collection steps and an eye-print match score from the preset eye-print algorithm.

The preset facial algorithm and the preset eye-print algorithm may be convolutional neural network algorithms, multi-layer neural network algorithms, etc. No limitations are placed on this by the embodiments of this specification. The facial comparison score is used to reflect the degree to which the facial image of the identity verification object matches the preset facial image. A higher facial comparison score means a higher match between the facial image of the identity verification object and the preset facial image. The eye-print liveness score is used to reflect the fidelity of the collected eye-print pair images of the identity verification object. A higher eye-print liveness score means higher fidelity of the eye-print pair image. The eye-print match score is used to reflect the degree to which the eye-print pair images of the identity verification object match the preset eye-print templates. A higher eye-print match score means a higher match between the eye-print pair images of the identity verification object and the preset eye-print templates.

Referring again to FIG. 2, the method includes sending successful identity verification information to the client when the comparison results for the facial image and the eye-print pair images meet preset conditions, at 206.

In some embodiments, step 206 may comprise sending successful identity verification information to the client if the facial comparison score, the multiple eye-print liveness scores, and the eye-print match score are greater than respective preset threshold scores. In some embodiments, when the facial comparison score, the multiple eye-print liveness scores, and eye-print match score all are greater than the respective preset threshold scores, identity verification is determined as successful, thus boosting the precision and reliability of the user identity verification method.

Referring again to FIG. 2, the method includes, when the comparison results for the facial image in the one or more eye-print pair meet the preset conditions, updating the eye-print templates corresponding to the identity verification object that are stored in the preset storage location based on the eye-print pair images collected by the client, at 207.

In some embodiments, when user identity verification is determined as successful, the eye-print pair images collected by the client at this time are deemed true and reliable, and the eye-print templates corresponding to the identity verification object stored in the preset storage location are updated based on the eye-print pair images collected by the client. This can further ensure the accuracy of the eye-print templates corresponding to the identity verification object that are stored in the preset storage location, thereby further boosting the precision of the user identity verification method.

Figure 10:
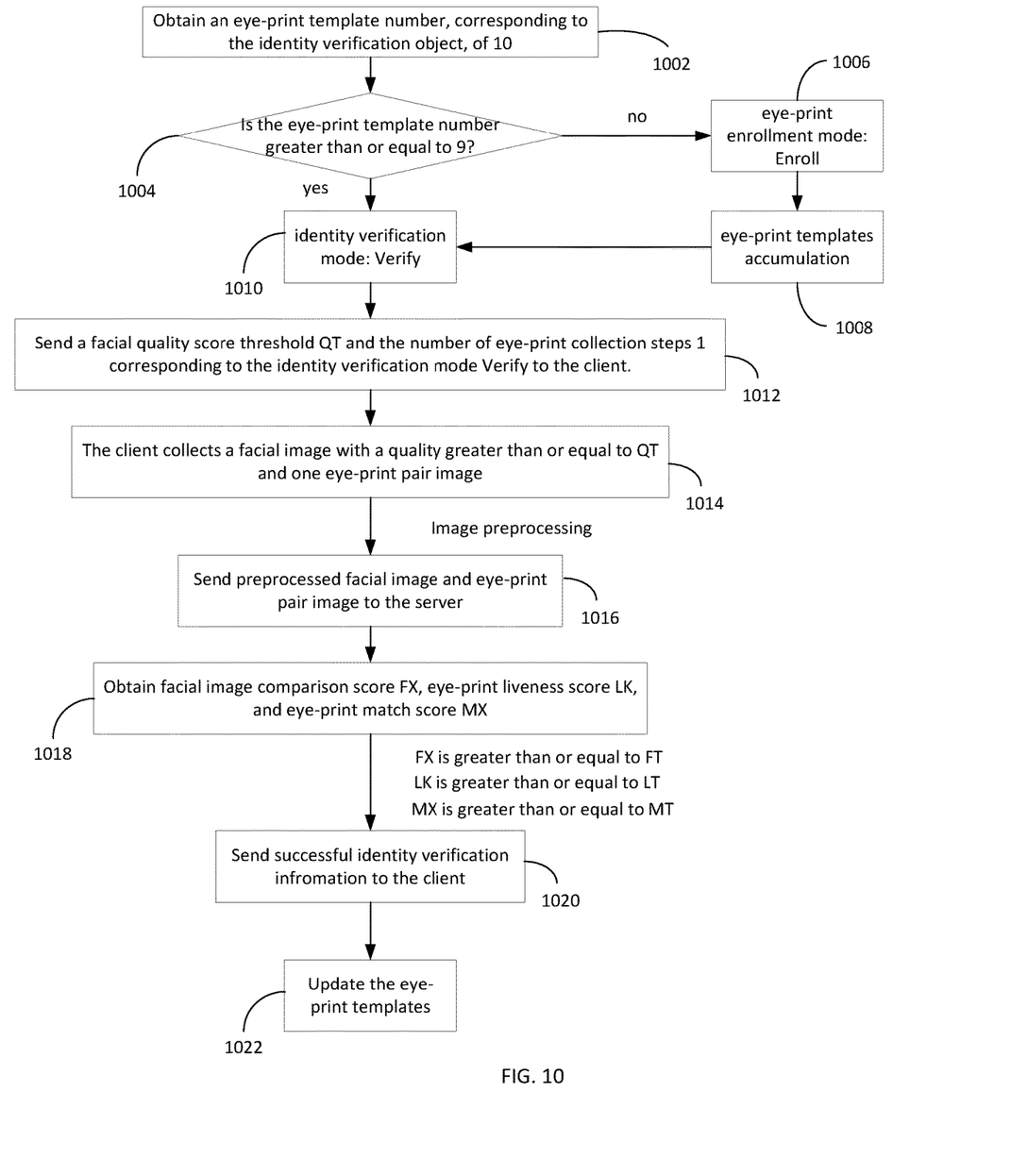
FIG. 10 presents a flow diagram of a user identity verification scenario presented by an embodiment of this specification.

FIG. 10 illustrates a specific application scenario flow according to some embodiments of the present disclosure. Referring to FIG. 10, the server may use a configured decision module, FEArbitrator, to obtain an eye-print template number of 10, corresponding to the identity verification object, at 1002. This is greater than the preset template number threshold of 9, at 1004, so the current mode is determined as identity verification mode "Verify", at 1010. Next, a facial quality score threshold QT and the number of eye-print collection steps 1 corresponding to the identity verification mode "Verify" is sent to the client, at 1012. At this time, the client collects a facial image and one eye-print pairs, at 1014. Then, after determining that the quality of the collected facial image is greater than or equal to QT, preprocessing such as optimization and compression is performed on the collected facial image and eye-print pair image, and then the preprocessed facial image and eye-print pair image are sent to the server, 1016. At this time, the server uses a preset facial algorithm to compare the facial image to a verified preset facial image and obtains a facial image comparison score FX, and uses a preset eye-print algorithm to compare the collected eye-print pair to preset eye-print templates and obtain an eye-print liveness score LK and eye-print match score MX, at 1018. If FX is greater than or equal to the preset facial comparison score threshold FT, LK is greater than or equal to the preset eye-print liveness score threshold LT, and MX is greater than or equal to the preset eye-print match score threshold, then successful identity verification information is sent to the client, at 1020 and the preset eye-print templates are updated based on the collected eye-print pair image, at 1022. If the number of eye-print templates corresponding to the identity verification object is less than 9, at 1004, the client is instructed to conduct eye-print pair image collection until the number of eye-print templates corresponding to the identity verification object is greater than or equal to 9, and the mode is switched to identity verification mode, at 1006 and 1008.

In another user identity verification method provided by this specification, when a user identity verification request is received, first a facial image and one or more eye-print pair images corresponding to an identity verification object are received from a client. The number of the one or more eye-print pair images corresponds to the number of eye-print collection steps. Then, the facial image is compared to a preset facial image, and the eye-print pair images are compared to preset eye-print templates. If the comparison results for the facial image and the eye-print pair images meet preset conditions, successful identity verification information will be sent to the client. Compared to the method of combining facial image recognition with live facial image verification commonly used today when performing user identity verification, this embodiment uses multidimensional verification modes such as facial verification combined with eye-print image verification and live eye-print image verification to perform user identity verification, thereby boosting the precision and reliability of the user identity verification method, and ensuring the security of apps used by the user.

Figure 3:
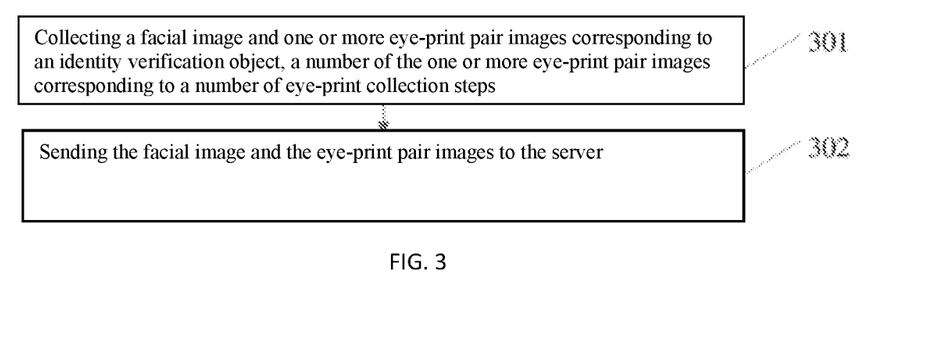
FIG. 3 presents a flow diagram of another user identity verification method provided by an embodiment of this specification.

Furthermore, an embodiment of this specification provides a user identity verification method, as shown in FIG. 3. Referring to FIG. 3, the method includes collecting a facial image and one or more eye-print pair images corresponding to an identity verification object, the number of the one or more eye-print pair images corresponding to the number of eye-print collection steps, at 301.

Here, the executing entity of this invention embodiment may be a client. The client may be configured on a mobile device with a webcam and microphone. These mobile devices include but are not limited to smartphones and tablet PCs. When the client receives a user request such as account login or payment, a facial image and one or more eye-print pair images corresponding to an identity verification object are collected for a server to perform security verification such as identity validation or payment identity validation for the user. The number of the one or more eye-print pair images corresponds to the number of eye-print collection steps.

Referring again to FIG. 3, the method includes sending the facial image and the eye-print pair images to the server, at 302.

As such, the server can perform identity verification of the identity verification object.

In some embodiments, before step 302, the method may also comprise the client performing preprocessing of the collected facial image and eye-print pair image. The preprocessing may comprise image optimization, image segmentation, image compression, facial image quality calculation, and eye-print liveness calculation. No limitations are placed on this by the embodiments of this specification. By performing preprocessing of the collected facial image and eye-print pair image, it is possible to ensure the true accuracy of the image used by the server for identity verification, thereby ensuring the precision of user identity verification.

An embodiment of this specification provides another user identity verification method. First, a facial image corresponding to the identity verification object and one or more eye-print pair images corresponding to the number of eye-print collection steps are collected, then the facial image and the eye-print pair images are sent to the server, causing the server to perform identity verification of the identity verification object. Compared to the method of combining facial image recognition with live facial image verification, commonly used today when performing user identity verification, this embodiment uses multidimensional verification modes such as facial verification combined with eye-print image verification and live eye-print image verification to perform user identity verification, thereby boosting the precision and reliability of the user identity verification method, and ensuring the security of apps used by the user.

Figure 4:
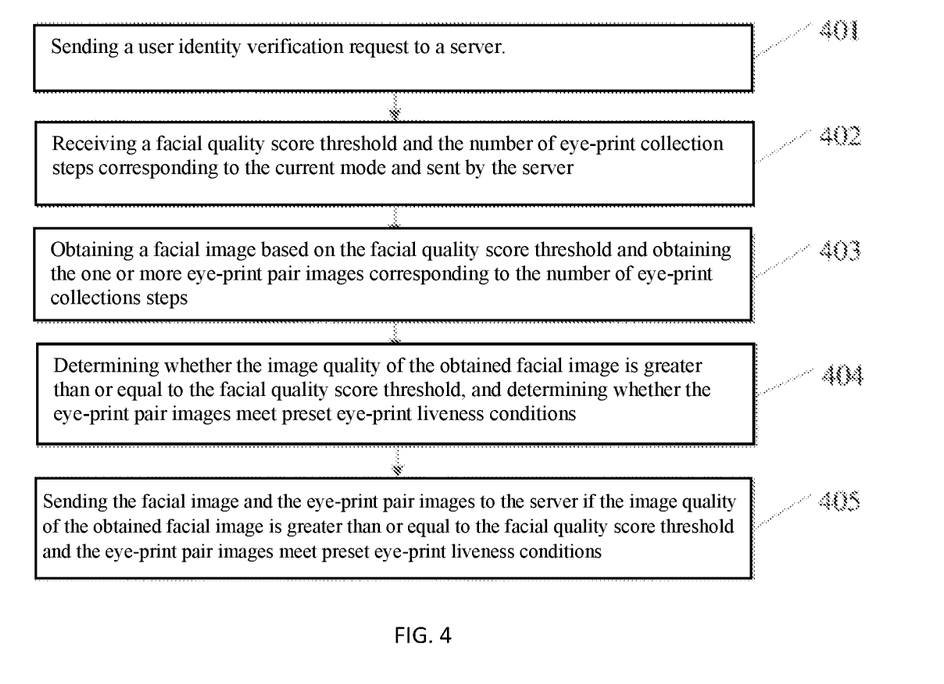
FIG. 4 presents a flow diagram of another user identity verification method provided by an embodiment of this specification.

An embodiment of this specification provides another user identity verification method, as shown in FIG. 4.

Referring to FIG. 4, the method includes sending a user identity verification request to a server, at 401.

The executing entity of this invention embodiment may be a client. The client may be configured on a mobile device with a webcam and microphone. These mobile devices include but are not limited to smartphones and tablet PCs. When the user requests the performance of an operation such as account login or payment, a user identity verification request is sent to a server, causing the server to perform security verification of the user, such as identity validation and payment identity validation. The user identity verification request may include identification information of the user, to enable the server to extract information such as the user's preset facial image or preset eye-print template, etc. from a database to perform subsequent user identity verification.

Referring again to FIG. 4, the method includes receiving a facial quality score threshold and the number of eye-print collection steps corresponding to the current mode and sent by the server, at 402.

The client can use communication means such as mobile cellular networks and WIFI networks to perform data transmission with the server. No limitations are placed on this by the embodiments of this specification. The relevant portions of step 101 may be referenced for an explanation of the identity verification mode, facial quality score threshold, and the number of eye-print collection steps. Further details will not be repeated here.

Referring again to FIG. 4, the method may include obtaining a facial image based on the facial quality score threshold and obtaining one or more eye-print pair images corresponding to the number of eye-print collections steps, at 403.

For example, a client may use a preset webcam to obtain a facial image and eye-print pair images of the current identity verification object. No limitations are placed on this by the embodiments of this specification.

Referring again to FIG. 4, the method may include determining whether the image quality of the currently obtained facial image is greater than or equal to the facial quality score threshold, and determining whether the eye-print pair images meets preset eye-print liveness conditions, at 404.

The preset eye-print liveness conditions are used to reflect the authenticity of the eye-print pair image. In some embodiments, before sending the facial image and the eye-print pair images to the server, by determining whether the image quality of the currently obtained facial image is greater than or equal to the facial quality score threshold, and by determining whether the eye-print pair images meets preset eye-print liveness conditions, it is possible to ensure the true accuracy of the image sent to the server for identity verification, thereby ensuring the precision of user identity verification.

Referring again to FIG. 4, the method may include sending the facial image and the eye-print pair images to the server if the image quality of the currently obtained facial image is greater than or equal to the facial quality score threshold and the eye-print pair images meets preset eye-print liveness conditions, at 405.

As such, the server can perform identity verification of the user. In some embodiments, after determining that the quality of the collected facial image and eye-print pair images meet requirements, these images are sent to the server. Thus it is possible to ensure the true accuracy of the images sent to the server for identity verification, thereby ensuring the precision of user identity verification.

An embodiment of this specification provides another user identity verification method. First, a facial image and one or more eye-print pair images corresponding to an identity verification object are collected, then the facial image and the eye-print pair images are sent to the server, causing the server to perform identity verification of the identity verification object. The number of the one or more eye-print pair images corresponds to the number of eye-print collection steps. Compared to the method of combining facial image recognition with live facial image verification, commonly used today when performing user identity verification, this embodiment uses multidimensional verification modes such as facial verification combined with eye-print image verification and live eye-print image verification to perform user identity verification, thereby boosting the precision and reliability of the user identity verification method, and ensuring the security of apps used by the user.

Figure 5:
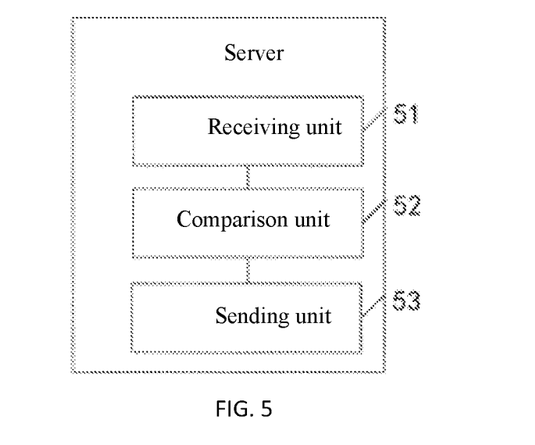
FIG. 5 presents a schematic diagram of a server provided by an embodiment of this specification.

As an implementation of the method shown in FIG. 1, an embodiment of this specification provides a server, as shown in FIG. 5. The server may comprise a receiving unit 51, comparison unit 52, and sending unit 53.

The receiving unit 51 is configured to receive a facial image and one or more eye-print pair images corresponding to an identity verification object from a client. The number of the one or more eye-print pair images corresponds to the number of eye-print collection steps.

The comparison unit 52 is configured to compare the facial image to a preset facial image, and compare the eye-print pair images to preset eye-print templates.

The sending unit 53 is configured to send successful identity verification information to the client if the comparison results for the facial image and the eye-print pair images meet preset conditions.

It should be noted that this apparatus embodiment corresponds to the aforementioned method embodiment. For ease of reading, this apparatus embodiment will not go over each detail given in the aforementioned method embodiment, but it should be clear that the apparatus of this embodiment is capable of achieving everything achieved in the aforementioned method embodiment.

An embodiment of this specification provides a server. When a user identity verification request is received, first, a facial image and one or more eye-print pair images corresponding to an identity verification object are received from a client. The number of the one or more eye-print pair images corresponds to the number of eye-print collection steps. Then the facial image is compared to a preset facial image, and the eye-print pair images are compared to preset eye-print templates. Successful identity verification information is sent to the client if the comparison results for the facial image and the eye-print pair images meet preset conditions. Compared to the method of combining facial image recognition with live facial image verification, commonly used today when performing user identity verification, this embodiment uses multidimensional verification modes such as facial verification combined with eye-print image verification and live eye-print image verification to perform user identity verification, thereby boosting the precision and reliability of the user identity verification method and ensuring security when a user uses an application.

Figure 6:
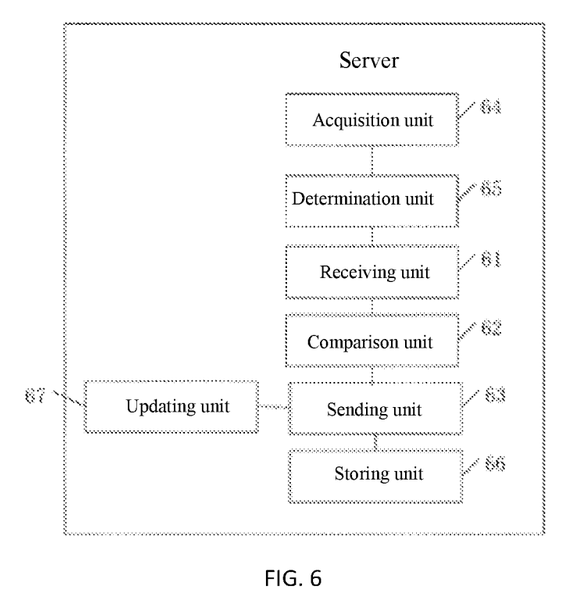
FIG. 6 presents a schematic diagram of another server provided by an embodiment of this specification.

As an implementation of the method shown in FIG. 2, an embodiment of this specification provides another server, as shown in FIG. 6. The server may comprise a receiving unit 61, comparison unit 62, sending unit 63, acquisition unit 64, determination unit 65, storing unit 66, and updating unit 67.

The receiving unit 61 is configured to receive a facial image and one or more eye-print pair images corresponding to an identity verification object from a client. The number of the one or more eye-print pair images corresponds to the number of eye-print collection steps.

The comparison unit 62 is configured to compare the facial image to a preset facial image, and compare the eye-print pair images to preset eye-print templates.

The sending unit 63 is configured to send successful identity verification information to the client if the comparison results for the facial image and the eye-print pair images meet preset conditions.

The acquisition unit 64, when receiving a user identity verification request, is configured to obtain the number of eye-print templates corresponding to the identity verification object from a preset storage location, where the eye-print templates corresponding to different identity verification objects are stored.

The determination unit 65, is configured to determine that the current mode is identity verification mode if the number of eye-print templates is greater than or equal to a preset threshold.

The sending unit 63 is also configured to send a facial quality score threshold and the number of eye-print collection steps corresponding to identity verification mode to a client, causing the client to obtain a facial image based on the facial quality score threshold and obtain one or more eye-print pair images corresponding to the number of eye-print collection steps.

The determination unit 65 is also configured to determine that the current mode is an eye-print enrollment mode if the number of eye-print templates is less than the preset threshold.

The sending unit 63 is also configured to send a facial quality score and the number of eye-print collection steps corresponding to the eye-print enrollment mode to the client, causing the client to obtain a facial image based on the facial quality score threshold and obtain one or more eye-print pair images corresponding to the number of eye-print collection steps.

The storing unit 66 is configured to store the eye-print pair images in the preset storage location as the eye-print templates corresponding to the preset identity verification object.

The comparison unit 62 is configured to use the facial image and the preset facial image as input to a preset facial algorithm, and obtain a facial comparison score corresponding to the identity verification object.

The eye-print pair images and the eye-print templates corresponding to the identity verification object are used as input to an eye-print algorithm to obtain multiple eye-print liveness scores corresponding to the number of eye-print collection steps and an eye-print match score.

Further, the sending unit 63 is configured to send successful identity verification information to the client if the facial comparison score, the multiple eye-print liveness scores, and the eye-print match score are greater than respective preset threshold scores.

The updating unit 67, when user identity verification is determined as successful, based on the eye-print pair images collected by the client, is configured to update the eye-print templates corresponding to the identity verification object stored in the preset storage location.

It should be noted that this apparatus embodiment corresponds to the aforementioned method embodiment. For ease of reading, for this apparatus embodiment, the specification will not repeat the details given in the aforementioned method embodiment, but it should be clear that the apparatus of this embodiment is capable of achieving everything achieved in the aforementioned method embodiment.

An embodiment of this specification provides another server. When a user identity verification request is received, first, a facial image and one or more eye-print pair images corresponding to an identity verification object are received from a client. The number of the one or more eye-print pair images corresponds to the number of eye-print collection steps. Then the facial image is compared to a preset facial image, and the eye-print pair images are compared to preset eye-print templates. Successful identity verification information is sent to the client if the comparison results for the facial image and the eye-print pair images meet preset conditions. Compared to the method of combining facial image recognition with live facial image verification commonly used today when performing user identity verification, the embodiments of this specification use multidimensional verification modes such as facial image verification combined with eye-print image verification and live eye-print image verification to perform user identity verification, thereby boosting the precision and reliability of the user identity verification method, and ensuring the security of apps used by the user.

Figure 7:
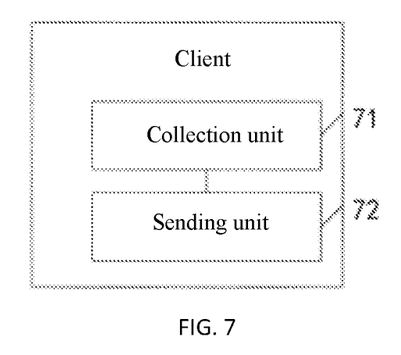
FIG. 7 presents a schematic diagram of a client provided by an embodiment of this specification.

Further, as an implementation of the method shown in FIG. 3, an embodiment of this specification provides a client, as shown in FIG. 7. The client may comprise: a collection unit 71 and sending unit 72.

The collection unit 71 is configured to collect a facial image corresponding to the identity verification object and one or more eye-print pair images corresponding to the number of eye-print collection steps.

The sending unit 72 is configured to send the facial image and the eye-print pair images to the server, causing the server to perform identity verification of the identity verification object.

It should be noted that this apparatus embodiment corresponds to the aforementioned method embodiment. For ease of reading, for this apparatus embodiment, the specification will not repeat the details given in the aforementioned method embodiment, but it should be clear that the apparatus of this embodiment is capable of achieving everything achieved in the aforementioned method embodiment.

An embodiment of this specification provides a client which first collects a facial image and one or more eye-print pair images corresponding to an identity verification object, the number of the one or more eye-print pair images corresponding to the number of eye-print collection steps, then sends the facial image and the eye-print pair images to the server, causing the server to perform identity verification of the identity verification object. Compared to the method of combining facial image recognition with live facial image verification, commonly used today when performing user identity verification, this embodiment uses multidimensional verification modes such as facial verification combined with eye-print image verification and live eye-print image verification to perform user identity verification, thereby boosting the precision and reliability of the user identity verification method, and ensuring the security of apps used by the user.

Figure 8:
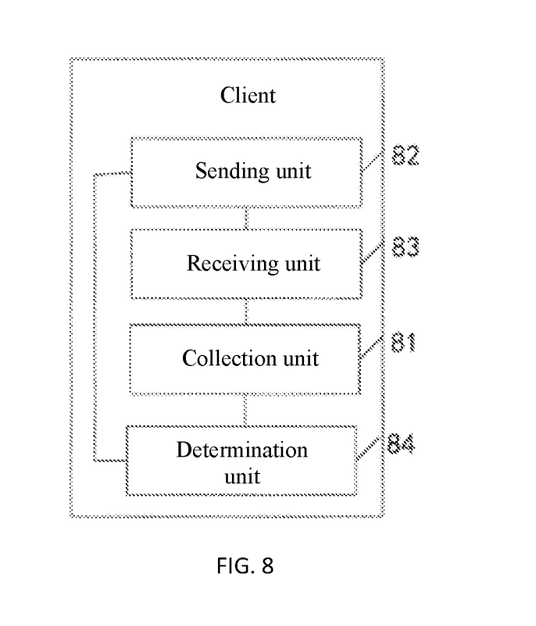
FIG. 8 presents a schematic diagram of another client provided by an embodiment of this specification.

Further, as an implementation of the method shown in FIG. 4, an embodiment of this specification provides another client, as shown in FIG. 8. The client may comprise a collection unit 81, sending unit 82, receiving unit 83, and determination unit 84.

The collection unit 81 is configured to collect a facial image and one or more eye-print pair images corresponding to an identity verification object, the number of the one or more eye-print pair images corresponding to the number of eye-print collection steps.

The sending unit 82 is configured to send the facial image and the eye-print pair images to the server, causing the server to perform identity verification of the identity verification object.

Further, the client also comprises a receiving unit 83.

The sending unit 82 is configured to send a user identity verification request to a server.

The receiving unit 83 is configured to receive a facial quality score threshold and the number of eye-print collection steps corresponding to the current mode and sent by the server.

The collection unit 81 is configured to obtain a facial image corresponding to the identity verification object based on the facial quality score threshold and to obtain one or more eye-print pair images corresponding to the number of eye-print collection steps.

Further, the client also comprises a determination unit 84.

The determination unit 84 is configured to determine whether the image quality of the currently obtained facial image is greater than or equal to the facial quality score threshold; if so, the sending unit is configured to send the facial image to the server.

The determination unit 84 is also configured to determine whether the eye-print pair images meets preset eye-print liveness conditions.

The sending unit 81 is also configured to send the eye-print pair images to the server if conditions are met.

It should be noted that this apparatus embodiment corresponds to the aforementioned method embodiment. For ease of reading, this apparatus embodiment will not go over each detail given in the aforementioned method embodiment, but it should be clear that the apparatus of this embodiment is capable of achieving everything achieved in the aforementioned method embodiment.

The specification provides another client. In one embodiment, the client first collects a facial image and one or more eye-print pair images corresponding to an identity verification object, the number of the one or more eye-print pair images corresponding to the number of eye-print collection steps, then sends the facial image and the eye-print pair images to the server, causing the server to perform identity verification of the identity verification object. Compared to the method of combining facial image recognition with live facial image verification, commonly used today when performing user identity verification, this embodiment uses multidimensional verification modes such as facial verification combined with eye-print image verification and live eye-print image verification to perform user identity verification, thereby boosting the precision and reliability of the user identity verification method, and ensuring the security of apps used by the user.

Figure 9:
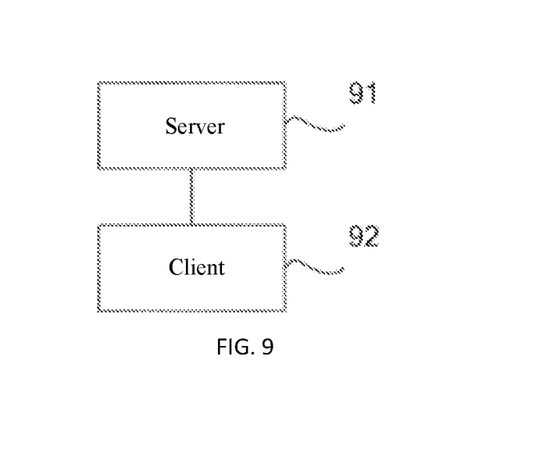
FIG. 9 presents a diagram of a user identity verification system provided by an embodiment of this specification.

Further, as an implementation of the methods shown in FIG. 1 and FIG. 3, an embodiment of this specification provides a user identity verification system, as shown in FIG. 9. The user identity verification system comprises a server 91 and a client 92.

The server 91 is configured to send a facial quality score threshold and the number of eye-print collection steps corresponding to the current mode to a client when a user identity verification request is received.

The client 92 is configured to obtain a facial image based on the facial quality score threshold and obtain one or more eye-print pair images corresponding to the number of eye-print collections steps.

The server 91 is also configured to receive a facial image sent by a client and one or more eye-print pair images corresponding to the number of eye-print collection steps; compare the facial image to a preset facial image, and compare the eye-print pair images to preset eye-print templates; and send successful identity verification information to the client if the comparison results for the facial image and the eye-print pair images meet preset conditions.

It should be noted that this apparatus embodiment corresponds to the aforementioned method embodiment. For ease of reading, for this apparatus embodiment, the specification will not repeat the details given in the aforementioned method embodiment, but it should be clear that the apparatus of this embodiment is capable of achieving everything achieved in the aforementioned method embodiment.

In a user identity verification system provided by an embodiment of this specification, when a user identity verification request is received, first a facial image and one or more eye-print pair images corresponding to an identity verification object are received from a client. The number of the one or more eye-print pair images corresponds to the number of eye-print collection steps. Then the facial image is compared to a preset facial image, the eye-print pair images are compared to preset eye-print templates, and successful identity verification information is sent to the client if the comparison results for the facial image and the eye-print pair images meet preset conditions. Compared to the method of combining facial image recognition with live facial image verification commonly used today when performing user identity verification, this embodiment uses multidimensional verification modes such as facial verification combined with eye-print image verification and live eye-print image verification to perform user identity verification, thereby boosting the precision and reliability of the user identity verification method, and ensuring the security of apps used by the user.

The user identity verification apparatus comprises a processor and a memory. The aforementioned virtual elements are all stored in the memory as program units, and the processor executes these program units that are stored in the memory to achieve corresponding functions.

The processor contains a kernel. The kernel retrieves the corresponding program units from the memory. There may be one or more kernels. By adjusting kernel parameters, it is possible to solve the existing problem of low precision in user identity verification methods.

The memory may include volatile memory on computer-readable media, random access memory (RAM), and/or non-volatile RAM, such as read-only memory (ROM) or flash RAM. The memory comprises at least one storage chip.

This application also provides a computer program product. When it is executed on a data processing device, it is suitable for executing and initializing program code with the following method steps. As an example, a server is configured to send a facial quality score threshold and the number of eye-print collection steps corresponding to the current mode to a client when a user identity verification request is received;

a client is configured to obtain a facial image based on the facial quality score threshold and obtain one or more eye-print pair images corresponding to the number of eye-print collections steps; and the server is also configured to receive a facial image sent by a client and one or more eye-print pair images corresponding to the number of eye-print collection steps; compare the facial image to a preset facial image, and compare the eye-print pair images to preset eye-print templates; and send successful identity verification information to the client if the comparison results for the facial image and the eye-print pair images meet preset conditions.

A person skilled in the art should understand that the embodiments of this application can be provided as methods, systems, or computer program products. Therefore, this application may employ a purely hardware embodiment form, purely software embodiment form, or an embodiment form that combines software and hardware. Also, this application may employ the form of computer program products achieved through one or more computer storage media (including but not limited to magnetic disc memory, CD-ROM, and optical memory) comprising computer-executable program code.

This application is described by referencing flow diagrams and/or block diagrams based on the user identity verification method, apparatus, system, and computer program product of this embodiment. It should be understood that computer program instructions can be used to achieve every flow and/or block in the flow diagrams and/or block diagrams, as well as combinations of flows and/or blocks in the flow diagrams and/or block diagrams. These computer program instructions can be provided to the processor of a general-purpose computer, special-purpose computer, embedded processing machine, or other programmable data processing device to produce a machine, causing the instructions executed by the processor of a computer or other programmable data processing device to produce a device used to achieve the specified functions of one or more flows in a flow diagram and/or one or more blocks in a block diagram.

These computer program instructions can also be stored in computer-readable memory that can cause a computer or other programmable data processing device to operate in a given mode, causing the instructions stored in this computer-readable memory to generate a product comprising an instruction apparatus. This instruction apparatus achieves the functions specified in one or more flows of a flow chart and/or one or more blocks of a block diagram.

These computer program instructions can also be loaded onto a computer or other programmable data processing device, enabling the execution of a series of operation steps on the computer or other programmable device to produce computer processing. Thus, the instructions executed on the computer or other programmable device provide steps for achieving the specified functions of one or more flows in a flow chart and/or one or more blocks in a block diagram.

In one typical configuration, the computation equipment comprises one or more processors (CPUs), input/output interfaces, network interfaces, and internal memory.

The memory could comprise the forms of volatile memory on computer-readable media, random access memory (RAM), and/or non-volatile RAM, such as read-only memory (ROM) or flash RAM. Memory is an example of computer-readable media.

Computer-readable media include permanent, nonpermanent, mobile, and immobile media, which can achieve information storage through any method or technology. The information may be computer-readable instructions, data structures, program modules, or other data. Examples of computer storage media include, but are not limited to, Phase-change RAM (PRAM), Static RAM (SRAM), Dynamic RAM (DRAM), other types of Random Access Memory (RAM), Read-Only Memory (ROM), Electrically Erasable Programmable Read-Only Memory (EEPROM), flash memory or other internal memory technologies, Compact Disk Read-Only Memory (CD-ROM), Digital Versatile Discs (DVD) or other optical memories, cassettes, magnetic tape and disk memories or other magnetic memory devices, or any other non-transmission media, which can be used for storing information that can be accessed by a computation device. According to the definitions herein, computer-readable media exclude transitory computer-readable media (transitory media), such as modulated data signals and carriers.

The preceding are merely embodiments of this application. They are not used to limit this application. For persons skilled in the art, this application could have various modifications and changes. All revisions, equivalent substitutions, and improvements made within the spirit and principles of this application shall fall within the scope of the claims of this application.

What is claimed is:

1. A non-transitory computer readable storage medium configured with instructions executable by one or more processors to cause the one or more processors to perform operations comprising:

receiving a facial quality score threshold and a number of eye-print collection steps;

obtaining a facial image of a user based on the received facial quality score threshold;

obtaining one or more eye-print pair images of the user, a number of the obtained one or more eye-print pair images corresponding to the received number of eye-print collection steps; and sending the facial image and the one or more eye-print pair images to a server to perform identity verification of the user.

2. The non-transitory computer readable storage medium of claim 1, wherein the operations further comprise: before sending the facial image to the server, determining that an image quality of the obtained facial image is no less than the facial quality score threshold.

3. The non-transitory computer readable storage medium of claim 1, wherein the operations further comprise: before sending the one or more eye-print pair images to the server, determining that the one or more eye-print pair images meet preset eye-print liveness conditions.

4. The non-transitory computer readable storage medium of claim 2, wherein the operations further comprise: before sending the one or more eye-print pair images to the server, determining that the one or more eye-print pair images meet preset eye-print liveness conditions.

5. The non-transitory computer readable storage medium of claim 1, wherein the operations further comprise: before sending the facial image and the one or more eye-print pair images to the server, performing preprocessing of the obtained facial image and one or more eye-print pair images, wherein sending the facial image and the one or more eye-print pair images to the server comprises: sending the preprocessed facial image and the preprocessed one or more eye-print pair images to the server.

6. The non-transitory computer readable storage medium of claim 1, wherein the operations further comprise: sending an identity verification request of the user to the server, wherein the identity verification request comprises identification information of the user to enable the server to perform the identity verification of the user.

7. The non-transitory computer readable storage medium of claim 6, wherein the identity verification request is sent to the server when the user requests performance of an account login or payment operation.

8. The non-transitory computer readable storage medium of claim 1, wherein the received facial quality score threshold and the received number of eye-print collection steps are sent by the server.

9. The non-transitory computer readable storage medium of claim 8, wherein the received number of eye-print collection steps correspond to a mode associated with a number of eye-print templates corresponding to the user that are stored in a storage location.

10. A non-transitory computer readable storage medium configured with instructions executable by one or more processors to cause the one or more processors to perform operations comprising:

receiving an identity verification request of a user from a client;

obtaining a number of eye-print templates corresponding to the user from a storage location, wherein the storage location is configured to store eye-print templates corresponding to different users;

determining a current mode according to the number of obtained eye-print templates corresponding to the user; and sending a facial quality score threshold and a number of eye-print collection steps corresponding to the current mode to the client to obtain a facial image of the user based on the facial quality score threshold and obtain one or more eye-print pair images of the user corresponding to the number of eye-print collection steps.

11. The non-transitory computer readable storage medium of claim 10, wherein the obtained number of eye-print templates corresponding to the user is no less than a preset threshold, wherein the determined current mode is an identity verification mode, wherein the number of eye-print collection steps correspond to the identity verification mode.

12. The non-transitory computer readable storage medium of claim 11, the operations further comprising:

receiving the facial image and the one or more eye-print pair images corresponding to the user from the client, wherein the number of received one or more eye-print pair images corresponds to the number of eye-print collection steps;

comparing the facial image to a preset facial image, and comparing the one or more eye-print pair images to eye-print templates corresponding to the user; and when comparison results for the facial image and the one or more eye-print pair images meet preset conditions, sending successful identity verification information to the client.

13. The non-transitory computer readable storage medium of claim 12, wherein:

comparing the facial image to the preset facial image comprises:

using the facial image and the preset facial image as input to a facial algorithm;

and obtaining a facial comparison score corresponding to the user from the facial algorithm.

14. The non-transitory computer readable storage medium of claim 12, wherein when the comparison results for the facial image and the one or more eye-print pair images meet the preset conditions, updating the eye-print templates corresponding to the user.

15. The non-transitory computer readable storage medium of claim 10, wherein the obtained number of eye-print templates corresponding to the user is less than a preset threshold, wherein the determined current mode is an eye-print enrollment mode, wherein and the number of eye-print collection steps correspond to the eye-print enrollment mode.

16. The non-transitory computer readable storage medium of claim 15, the operations further comprising:

receiving the one or more eye-print pair images corresponding to the user from the client, wherein the number of received one or more eye-print pair images corresponds to the number of eye-print collection steps; and storing the received one or more eye-print pair images in the storage location as eye-print templates corresponding to the user.

17. A method, comprising:

receiving an identity verification request of a user from a client;

obtaining a number of eye-print templates corresponding to the user from a storage location, wherein the storage location is configured to store eye-print templates corresponding to different users;

determining a current mode according to the number of obtained eye-print templates corresponding to the user; and sending a facial quality score threshold and a number of eye-print collection steps corresponding to the current mode to the client to obtain a facial image of the user based on the facial quality score threshold and obtain one or more eye-print pair images of the user corresponding to the number of eye-print collection steps.

18. The method of claim 17, wherein the obtained number of eye-print templates corresponding to the user is no less than a preset threshold, wherein the determined current mode is an identity verification mode, wherein the set facial quality score threshold and the number of eye-print collection steps correspond to the identity verification mode.

19. The method of claim 18, further comprising:
receiving the facial image and the one or more eye-print pair images corresponding to the user from the client, wherein the number of received one or more eye-print pair images corresponds to the number of eye-print collection steps;
comparing the facial image to a preset facial image, and comparing the one or more eye-print pair images to eye-print templates corresponding to the user; and
when comparison results for the facial image and the one or more eye-print pair images meet preset conditions, sending successful identity verification information to the client.

20. The method of claim 17, wherein the obtained number of eye-print templates corresponding to the user is less than a preset threshold, wherein the determined current mode is an eye-print enrollment mode, wherein the number of eye-print collection steps correspond to the eye-print enrollment mode, the method further comprising:
receiving the one or more eye-print pair images corresponding to the user from the client, wherein the number of received one or more eye-print pair images corresponds to the number of eye-print collection steps; and
storing the received one or more eye-print pair images in the storage location as eye-print templates corresponding to the user.

* * * * *